(12) United States Patent
Jackson et al.

(10) Patent No.: US 10,468,645 B2
(45) Date of Patent: Nov. 5, 2019

(54) VEHICLE FRAME MOUNTED HIGH VOLTAGE BATTERY ASSEMBLY

(71) Applicant: FORD GLOBAL TECHNOLOGIES, LLC, Dearborn, MI (US)

(72) Inventors: Eric Emil Jackson, Canton, MI (US); Charlie Qian, Dearborn, MI (US); Stephen Pien, Farmington Hills, MI (US); Jim William Dunham, Plymouth, MI (US); Paul Elia, West Bloomfield, MI (US); Chris P. Roxin, West Bloomfield, MI (US); Jagjit Romana, Northville, MI (US); Tim Alan Mouch, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 772 days.

(21) Appl. No.: 14/608,431

(22) Filed: Jan. 29, 2015

(65) Prior Publication Data

US 2016/0226041 A1 Aug. 4, 2016

(51) Int. Cl.

| | |
|---|---|
| *H01M 2/10* | (2006.01) |
| *H01M 10/625* | (2014.01) |
| *H01M 10/658* | (2014.01) |
| *B60K 1/04* | (2019.01) |
| *B60K 13/04* | (2006.01) |
| *H01M 10/6556* | (2014.01) |
| *H01M 10/613* | (2014.01) |
| H01M 10/6568 | (2014.01) |

(52) U.S. Cl.
CPC ............ *H01M 2/1083* (2013.01); *B60K 1/04* (2013.01); *H01M 10/613* (2015.04); *H01M 10/625* (2015.04); *H01M 10/658* (2015.04); *H01M 10/6556* (2015.04); *B60K 13/04* (2013.01); *B60K 2001/0438* (2013.01); *B60Y 2410/114* (2013.01); *H01M 10/6568* (2015.04); *H01M 2220/20* (2013.01)

(58) Field of Classification Search
CPC ............ H01M 10/613; H01M 10/625; H01M 10/6556; H01M 10/6568; H01M 10/658; H01M 2/1083; B60K 13/04; B60K 1/04; B60K 2001/0438; B60Y 2410/114
See application file for complete search history.

(56) References Cited

U.S. PATENT DOCUMENTS

| | | | |
|---|---|---|---|
| 5,590,524 A | * | 1/1997 | Moore, III ............ F01N 13/102 181/240 |
| 5,620,057 A | * | 4/1997 | Klemen ................... B60K 1/04 180/65.1 |
| 7,501,206 B2 | | 3/2009 | Watanabe et al. |
| 7,614,469 B2 | | 11/2009 | Kumar et al. |
| 7,734,384 B2 | | 6/2010 | Konopa et al. |

(Continued)

FOREIGN PATENT DOCUMENTS

WO WO-2014195104 A1 * 12/2014 ............... B60K 1/04

*Primary Examiner* — Sarah A. Slifka
*Assistant Examiner* — Lilia Nedialkova
(74) *Attorney, Agent, or Firm* — Carlson, Gaskey & Olds

(57) ABSTRACT

A battery assembly according to an exemplary aspect of the present disclosure includes, among other things, a tray, a battery pack received within the tray, a cover positioned over the battery pack and a mounting assembly connected to the tray and including at least one bushing configured to establish an interface with a vehicle component.

7 Claims, 4 Drawing Sheets

(56) References Cited

U.S. PATENT DOCUMENTS

| | | | |
|---|---|---|---|
| 7,997,368 B2 | 8/2011 | Takasaki et al. | |
| 8,286,743 B2 | 10/2012 | Rawlinson | |
| 9,283,837 B1 * | 3/2016 | Rawlinson | H02K 5/04 |
| 2002/0175455 A1 * | 11/2002 | Tousi | F16F 1/3835 |
| | | | 267/140.3 |
| 2011/0168468 A1 * | 7/2011 | Taguchi | B60K 1/02 |
| | | | 180/65.245 |
| 2011/0180339 A1 * | 7/2011 | Kawamura | B60K 5/04 |
| | | | 180/65.245 |
| 2012/0121962 A1 * | 5/2012 | Katayama | B60K 1/04 |
| | | | 429/120 |
| 2012/0160583 A1 | 6/2012 | Rawlinson | |
| 2012/0228042 A1 * | 9/2012 | Jost | A61G 5/045 |
| | | | 180/65.51 |
| 2012/0255804 A1 * | 10/2012 | Akoum | B60K 1/00 |
| | | | 180/291 |
| 2013/0000997 A1 * | 1/2013 | Peng | B62D 47/02 |
| | | | 180/65.6 |
| 2013/0153317 A1 | 6/2013 | Rawlinson et al. | |
| 2013/0174804 A1 * | 7/2013 | Matsuda | F02B 77/00 |
| | | | 123/198 R |
| 2013/0248268 A1 * | 9/2013 | Matsuda | B60K 1/04 |
| | | | 180/68.5 |
| 2014/0017538 A1 * | 1/2014 | Nakamori | H01M 2/1077 |
| | | | 429/99 |
| 2016/0083012 A1 * | 3/2016 | Stenzenberger | B60K 1/04 |
| | | | 180/62 |

* cited by examiner

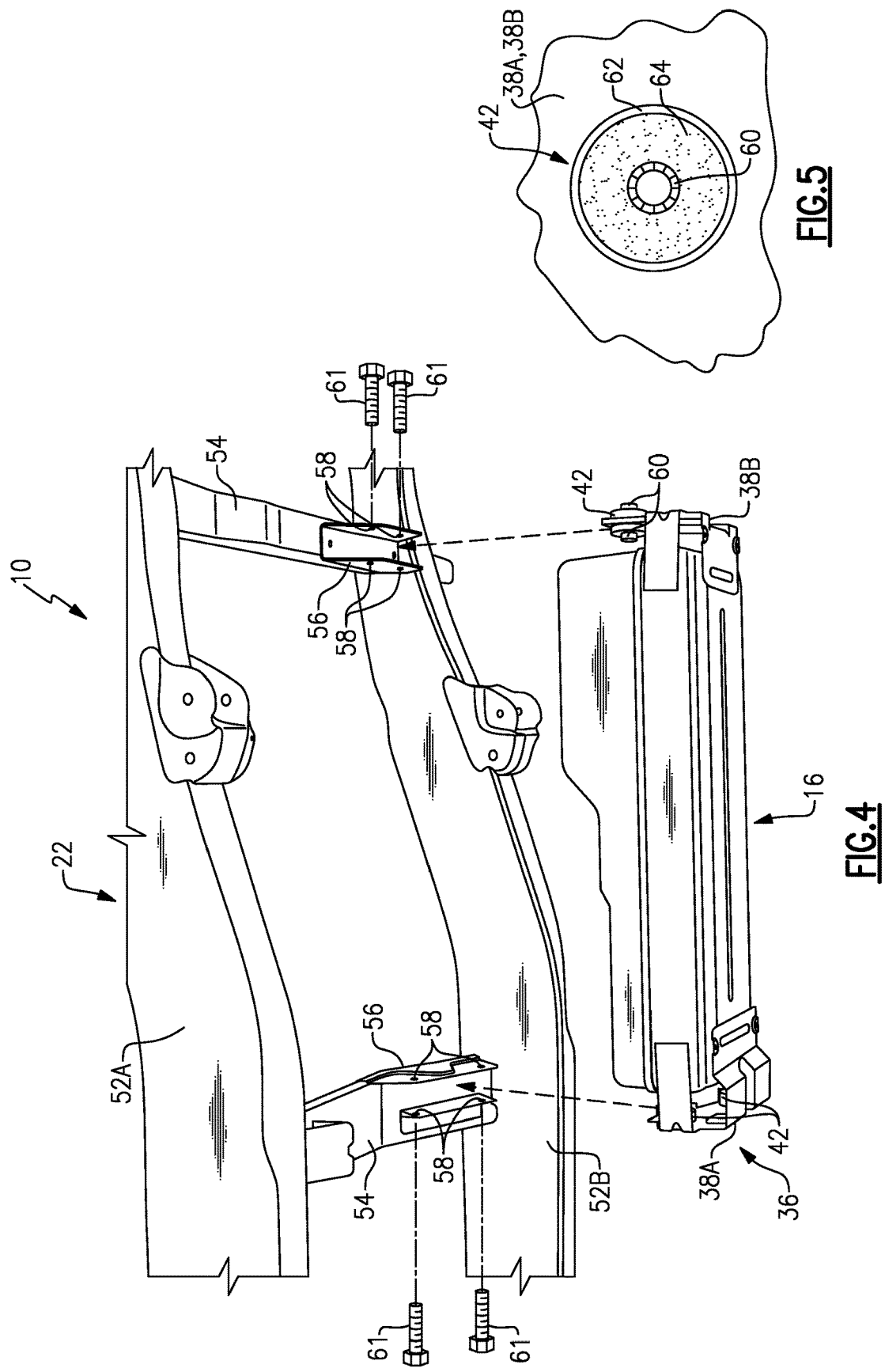

VEHICLE FRAME MOUNTED HIGH VOLTAGE BATTERY ASSEMBLY

TECHNICAL FIELD

This disclosure relates to a battery assembly for an electrified vehicle. The battery assembly is suspended from a vehicle frame by a mounting assembly that includes one or more interface devices. The interface devices isolate the battery assembly from energy transmitted from the vehicle frame.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

A high voltage battery pack is employed to power the electric machines of an electrified vehicle. The high voltage battery pack typically includes multiple battery arrays that included a plurality of interconnected battery cells and various electronic components that are required to interface with the electrified vehicle. Traditionally, the high voltage battery pack is mounted in a passenger compartment or cargo space of the electrified vehicle. The battery pack therefore occupies an amount of space that would otherwise be available for carrying passengers or cargo.

SUMMARY

A battery assembly according to an exemplary aspect of the present disclosure includes, among other things, a tray, a battery pack received within the tray, a cover positioned over the battery pack and a mounting assembly connected to the tray and including at least one bushing configured to establish an interface with a vehicle component.

In a further non-limiting embodiment of the foregoing battery assembly, the mounting assembly includes a first bracket attached near a first end of the tray and a second bracket attached near a second end of the tray, each of the first bracket and the second bracket including multiple bushings.

In a further non-limiting embodiment of either of the foregoing battery assemblies, the vehicle component is a vehicle frame.

In a further non-limiting embodiment of any of the foregoing battery assemblies, the battery pack is a high voltage battery pack that includes at least one battery array having a plurality of battery cells.

In a further non-limiting embodiment of any of the foregoing battery assemblies, a heat shield is mounted to an underside of the tray.

In a further non-limiting embodiment of any of the foregoing battery assemblies, insulation is between the cover and the battery pack and between the tray and the battery pack.

In a further non-limiting embodiment of any of the foregoing battery assemblies, a thermal management system includes inlet and outlet tubing disposed between the tray and the battery pack.

In a further non-limiting embodiment of any of the foregoing battery assemblies, the thermal management system is configured to cool the battery pack from exceeding an upper threshold temperature.

In a further non-limiting embodiment of any of the foregoing battery assemblies, the battery pack includes a second cover and a battery pack base that are separate from the tray and the cover.

In a further non-limiting embodiment of any of the foregoing battery assemblies, the bushing includes an inner sleeve, an outer casing, and a flexible member extending radially between the inner sleeve and the outer casing.

An electrified vehicle according to another exemplary aspect of the present disclosure includes, among other things, a floor pan, an exhaust system that extends under the floor pan and a high voltage battery assembly mounted between the floor pan and the exhaust system.

In a further non-limiting embodiment of the foregoing electrified vehicle, the high voltage battery assembly is mounted at a location that is remote from a passenger cabin that is located on an opposite side of the floor pan.

In a further non-limiting embodiment of either of the foregoing electrified vehicles, the high voltage battery assembly is mounted axially between a fuel tank and frame rail of a vehicle frame.

In a further non-limiting embodiment of any of the foregoing electrified vehicles, the high voltage battery assembly is suspended from a vehicle frame by at least one bushing.

In a further non-limiting embodiment of any of the foregoing electrified vehicles, a heat shield is mounted between the high voltage battery assembly and the exhaust system.

An electrified vehicle according to another exemplary aspect of the present disclosure includes, among other things, a vehicle frame, a battery assembly suspended from the vehicle frame and a mounting assembly that includes at least one bushing configured to establish an interface between the battery assembly and the vehicle frame to provide road load isolation to a battery pack of the battery assembly.

In a further non-limiting embodiment of the foregoing electrified vehicle, the battery assembly is mounted between a floor pan and an exhaust system.

In a further non-limiting embodiment of either of the foregoing electrified vehicles, a bracket extends from the vehicle frame and receives the bushing to suspend the battery assembly from the vehicle frame, the bushing configured to provide road load isolation at an interface between the battery assembly and the vehicle frame.

In a further non-limiting embodiment of any of the foregoing electrified vehicles, insulation at least partially surrounds the battery pack.

In a further non-limiting embodiment of any of the foregoing electrified vehicles, the bushing includes an inner sleeve, an outer casing, and a flexible member extending radially between the inner sleeve and the outer casing.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 4 schematically illustrates the installation of a battery assembly onto a vehicle frame.

FIG. 5 is a cross-sectional view of a bushing that provides road load isolation at a vehicle frame/battery assembly interface.

DETAILED DESCRIPTION

This disclosure details an exemplary battery assembly for an electrified vehicle. The battery assembly, which includes a high voltage battery pack, is secured relative to a vehicle frame of the electrified vehicle and therefore does not reduce the available space of the passenger compartment or cargo area of the vehicle. In some embodiments, the battery assembly is mounted between a floor pan and an exhaust system of the electrified vehicle. In other embodiments, the battery assembly is suspended from the vehicle frame by a mounting assembly that includes one or more interface devices that isolate the battery assembly from vibrations or other loads communicated from the vehicle frame. These and other features are discussed in greater detail in the following paragraphs of this disclosure.

Figure 1:
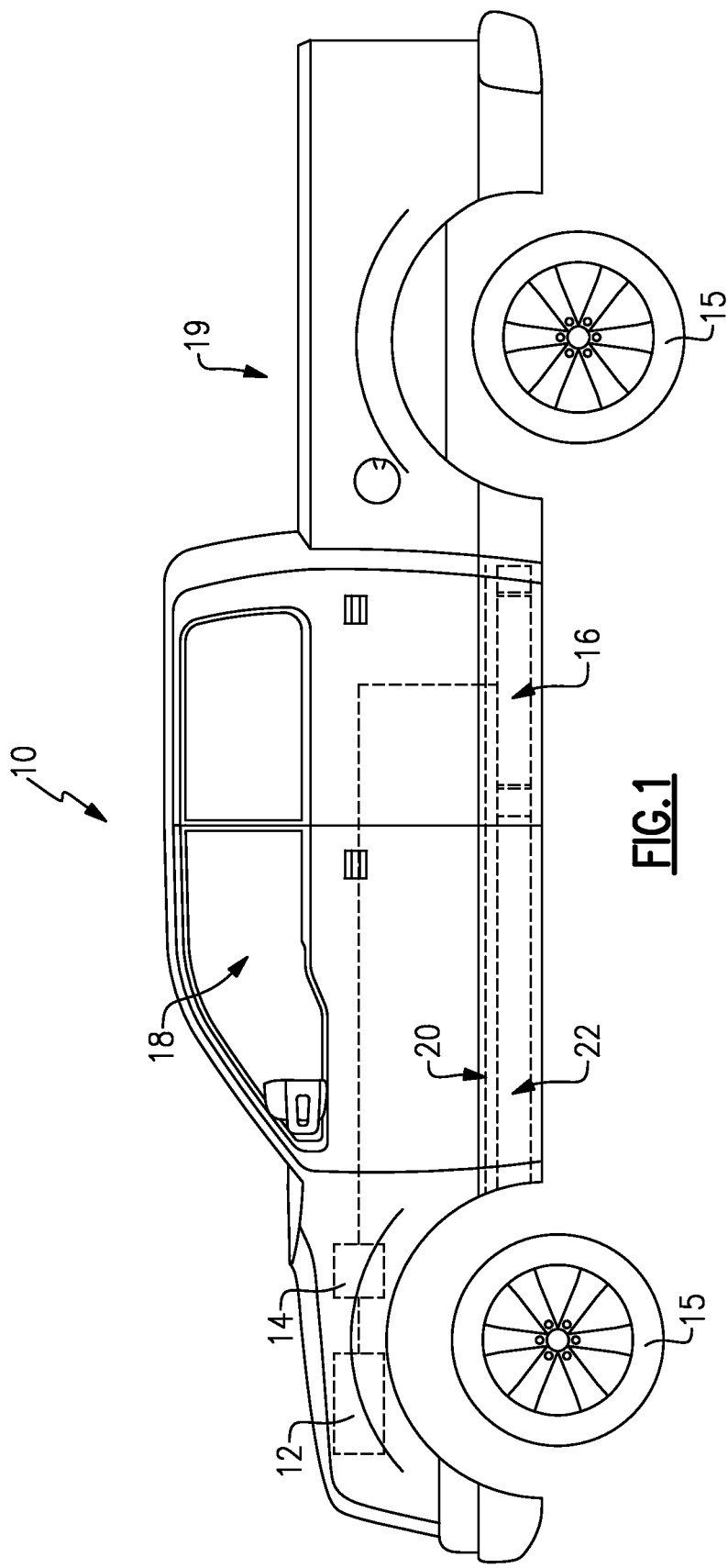
FIG. 1 schematically illustrates an electrified vehicle.

FIG. 1 schematically illustrates an electrified vehicle 10. In one non-limiting embodiment, the electrified vehicle 10 is a hybrid electric vehicle (HEV). However, this disclosure is not limited to HEV's and could extend to other types of electrified vehicles, including but not limited to plug-in hybrid electric vehicles (PHEV's) and battery electric vehicles (BEV's). The electrified vehicle 10 is also depicted as a pickup truck. However, trucks, cars, vans or any other types of vehicles could benefit from the teachings of this disclosure. In addition, although a specific component relationship is illustrated in FIG. 1, this illustration is not intended to limit this disclosure. In other words, the placement and orientation of the various components of the electrified vehicle 10 could vary within the scope of this disclose.

The exemplary electrified vehicle 10 includes a powertrain that may include an engine 12 and an electric machine 14. The engine 12, which may be an internal combustion engine, and the electric machine 14, which could be a motor, generator or a combined motor/generator, may both be employed as available drive sources for the electrified vehicle 10. For example, the engine 12 and/or the electric machine 14 can generate torque to drive one or more sets of vehicle drive wheels 15 of the electrified vehicle 10. A high voltage battery assembly 16 may electrically power the electric machine 14.

The electrified vehicle 10 may additionally include a passenger cabin 18 and a cargo area 19 (here, a pick-up bed) to the rear of the passenger cabin 18. A floor pan 20 separates the passenger cabin 18 from a vehicle frame 22. The battery assembly 16 may be suspended from the vehicle frame 22 such that it is remote from both the passenger cabin 18 and the cargo area 19. The battery assembly 16 therefore does not occupy space that would otherwise be available for carrying passengers or cargo.

Figure 2:
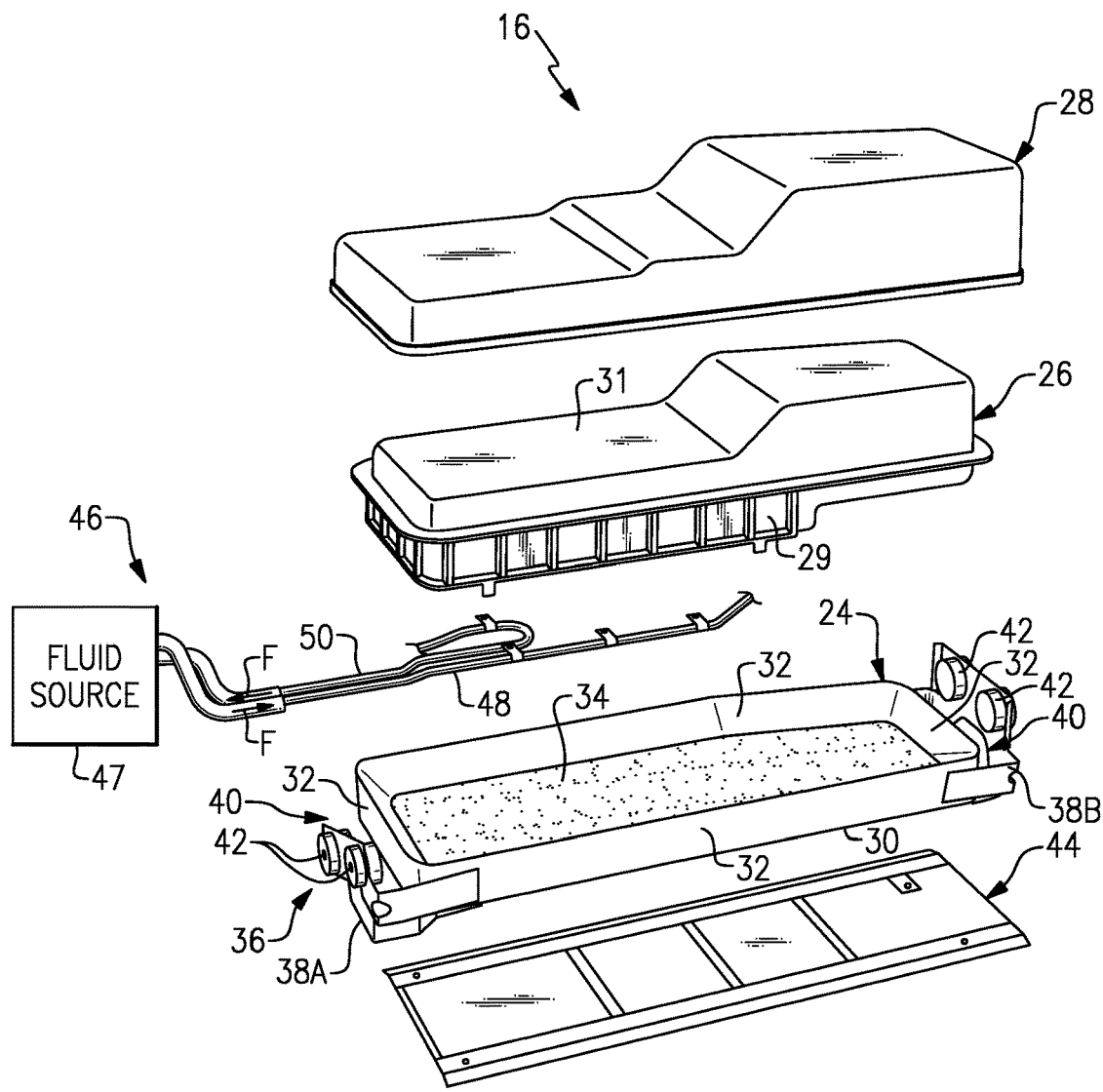
FIG. 2 is an exploded view of a battery assembly with integral thermal protection that can be incorporated into an electrified vehicle.

FIG. 2 is an exploded view of the battery assembly 16, which is only schematically depicted in FIG. 1. The battery assembly 16 may include a tray 24, a battery pack 26, a cover 28, a heat shield 44 and a thermal management system 46. The battery pack 26 may be a high voltage battery pack that includes one or more battery arrays that each includes a plurality of battery cells stacked side-by side to build the battery array (see, for example, FIG. 3).

The battery pack 26 is received within the tray 24. The cover 28 is received over the tray 24 to house the battery pack 26. In one embodiment, the cover 28 is positioned over the battery pack 26 and is secured to the tray 24 using one or more fasteners (not shown). The cover 28 may be a stamped part made of steel. Other materials are also contemplated within the scope of this disclosure.

The tray 24 may also be made from steel or some other suitable material. The tray 24 includes a bottom 30 and sidewalls 32 that extend upwardly from the bottom 30 to form the tray 24, which in one embodiment is pan shaped.

Insulation 34 may line the cover and/or one or more of the bottom 30 and the sidewalls 32 of the tray 24. In a non-limiting embodiment, the insulation 34 is high performance fiber insulation.

A mounting assembly 36 may be attached to the tray 24. In one embodiment, the mounting assembly 36 includes a first bracket 38A and a second bracket 38B mounted at opposing ends 40 of the tray 24. The first bracket 38A and the second bracket 38B may be attached to one or more of the bottom 30 and the sidewalls 32 of the tray 24.

Each of the first bracket 38A and the second bracket 38B may receive bushings 42 that establish an interface between the battery assembly 16 and the vehicle frame 22 (see FIGS. 4-7). In the illustrated embodiment, two bushings 42 are mounted within each of the first bracket 38A and the second bracket 38B; however, the mounting assembly 36 could include any amount of bushings 42. In one non-limiting embodiment, the bushings 42 are isolator bushings that isolate the battery assembly 16 from loads that act on the vehicle frame 22, as is further discussed below.

The heat shield 44 may be mounted to an underside of the tray 24 (i.e. on an opposite side of the tray 24 from the battery pack 26). The heat shield 44 is made of aluminized steel, in one embodiment, although other materials are also contemplated. The heat shield 44 shields the battery assembly 16 from heat generated by surrounding components of the electrified vehicle 10 and may also protect the battery assembly 16 from debris that may ricochet off the vehicle driving surface.

The battery assembly 16 may additionally include an insulated, liquid cooled thermal management system 46 for the temperature sensitive battery pack 26. The thermal management system 46 prevents the battery pack 26 from exceeding upper threshold temperatures for proper battery operation/life under all driving/environmental conditions. In one embodiment, the thermal management system 46 includes a fluid source 47, inlet tubing 48 and outlet tubing 50 for communicating a fluid F to and from the battery pack 26. The fluid F may remove heat from the battery pack 26. In one embodiment, the inlet tubing 48 and the outlet tubing 50 of the thermal management system 46 extend between the battery pack 26 and the tray 24.

Figure 3:
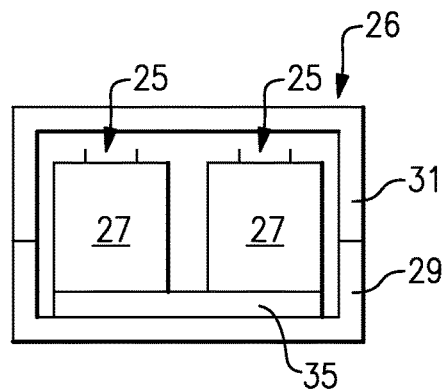
FIG. 3 illustrates a cross-section of a high voltage battery pack of a battery assembly.

FIG. 3 is a cross-sectional view through the battery pack 26. The battery pack 26 may include multiple battery arrays 25. Each battery array 25 includes a plurality of battery cells 27 stacked side-by side (into the page in FIG. 3) to build the battery array 25. The battery arrays 25 are housed inside a battery pack base 29 and a cover 31. As shown in FIG. 2, the battery pack base 29 and the cover 31 are separate structures from the tray 24 and the cover 28 of the battery assembly 16. The battery pack base 29 may include a cold plate 35.

FIG. 4 schematically illustrates the installation of the battery assembly 16 to the vehicle frame 22 of the electrified vehicle 10. The vehicle frame 22 may include a first frame rail 52A, a second frame rail 52B and cross members 54 that connect between the first frame rail 52A and the second frame rail 52B. The first frame rail 52A is spaced from the second frame rail 52B. The first and second frame rails 52A, 52B extend longitudinally to establish a length of the vehicle frame 22, and the cross members 54 extend in a direction that is transverse to the first frame rail 52A and the second frame rail 52B to establish a width of the vehicle frame 22.

Brackets 56 may be mounted to the cross members 54 for accommodating the bushings 42 of the mounting assembly 36. The bushings 42 are received by the brackets 56 to suspend the battery assembly 16 from the vehicle frame 22. In this way, the battery assembly 16 is secured relative to the vehicle frame 22 but is not hard mounted to it. In one non-limiting embodiment, the brackets 56 include openings 58 that receive inner sleeves 60 of the bushings 42. Bolts 61 may be received through the inner sleeves 60 and openings 58 to secure the bushings 42 to the brackets 56. Of course, other mounting configurations are also contemplated within the scope of this disclosure.

The bushings 42 establish an interface between the vehicle frame 22 and the battery assembly 16 and will dampen energy that is transmitted from the vehicle frame 22 isolating the battery assembly 16 from vibrations and other high acceleration loads. In some embodiments, the bushings 42 allow some amount of movement to occur between the battery assembly 16 and the vehicle frame 22. For example, the bushings 42 may allow the battery assembly 16 to slightly move in multiple degrees of freedom relative to the vehicle frame 22 to create a modal misalignment between the battery assembly 16 and the vehicle frame 22.

Referring to FIG. 5, each bushing 42 may include the inner sleeve 60, an outer casing 62, and a flexible member 64 extending radially between the inner sleeve 60 and the outer casing 62. The flexible member 64 may be made of rubber, polyurethane, or some other flexible material. The flexible member 64 is configured to act as a damper for dampening energy transmitted from the vehicle frame 22 through the brackets 38A, 38B in order to isolate the battery assembly 16 from this energy. This disclosure is not limited to the specific bushing configuration shown in FIG. 5. Indeed, other bushing type isolation devices are contemplated as within the scope of this disclosure.

Figure 6:
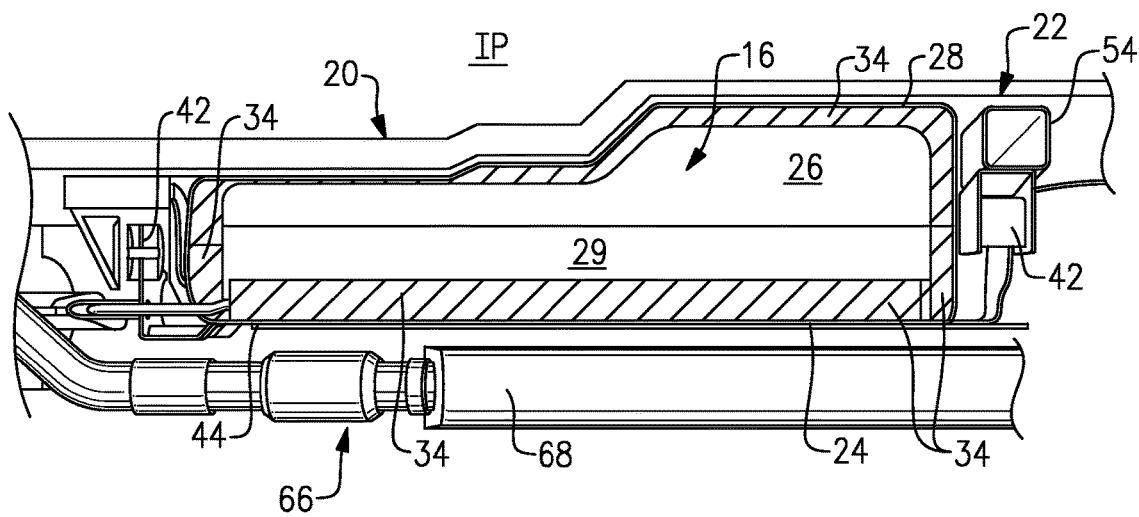
FIG. 6 is a cross-sectional side 9 view of a battery assembly installed onto a vehicle frame.
Figure 7:
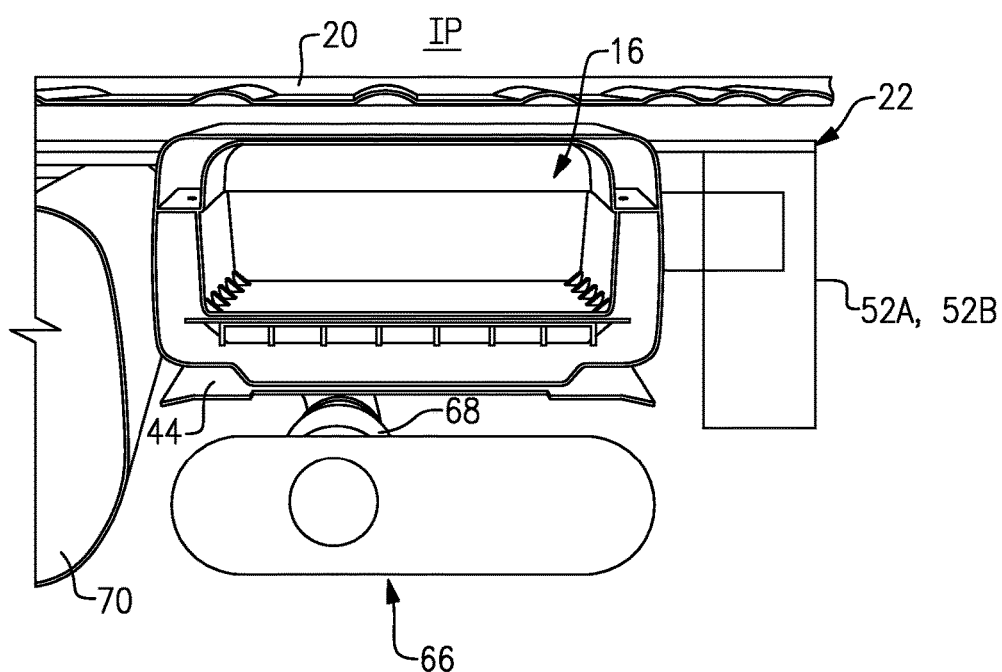
FIG. 7 is a rear, cross-sectional view of a battery assembly installed on a vehicle frame.

FIGS. 6 and 7, with continued reference to FIGS. 1-5, illustrate an installed position IP of the battery assembly 16 relative to the vehicle frame 22. The battery assembly 16 is suspended from the vehicle frame 22. The bushings 42 provide road load dampening at the vehicle frame 22 interface preventing high dynamic loads from entering the battery pack 26.

In one embodiment, the battery assembly 16 extends between the floor pan 20 and an exhaust system 66 of the electrified vehicle 10. The exhaust system 66 may be disposed underneath the floor pan 20 and extends at least partially beneath the vehicle frame 22. In another embodiment, the battery assembly 16 is secured relative to the vehicle frame 22 at a location between the floor pan 20 and piping 68 of the exhaust system 66.

The battery assembly 16 may also be mounted adjacent to a fuel tank 70 of the electrified vehicle 10. For example, in another non-limiting embodiment, the battery assembly 16 is axially disposed between the fuel tank 70 and one of the frame rails 52A, 52B of the vehicle frame 22 (see FIG. 7).

The heat shield 44 is positioned between the battery assembly 16 and the exhaust system 66 to insulate the battery assembly 16 from any heat that is expelled by the exhaust system 66. Insulation 34 may be positioned around the battery pack 26 of the battery assembly 16 to provide additional protection against the high heat conditions that may exist near the exhaust system 66. In one non-limiting embodiment, insulation 34 is provided between the cover 28 and the battery pack 26 and between the tray 24 and the battery pack 26 (see FIG. 6).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a floor pan;
   an exhaust system;
   opposing and longitudinally extending vehicle frame rails;
   a battery assembly mounted axially between said floor pan and said exhaust system and axially between a fuel tank and one of said vehicle frame rails;
   a heat shield panel mounted axially between a tray of said battery assembly and said exhaust system;
   a mounting assembly including a first bushing at a first longitudinal end of said battery assembly and a second bushing at a second longitudinal end of said battery assembly;
   a first cross member extending between said opposing and longitudinally extending vehicle frame rails;
   a first bracket mounted to said first cross member and configured to receive said first bushing; and
   a first bolt extending through an opening of said first bracket and an inner sleeve of said first bushing to secure said first bushing to said first bracket.

2. The electrified vehicle as recited in claim 1, wherein said exhaust system is completely below said battery assembly.

3. The electrified vehicle as recited in claim 1, comprising:
   a second cross member extending between said opposing and longitudinally extending vehicle frame rails;

a second bracket mounted to said second cross member and configured to receive said second bushing; and a second bolt extending through an opening of said second bracket and an inner sleeve of said second bushing to secure said second bushing to said second bracket.

4. The electrified vehicle as recited in claim 1, comprising:

an insulation disposed between said tray and a battery pack of said battery assembly.

5. The electrified vehicle as recited in claim 1, wherein the heat shield panel is a metallic panel.

6. The electrified vehicle as recited in claim 5, wherein the metallic panel is made of aluminized steel.

7. An electrified vehicle, comprising:

a floor pan;

an exhaust system;

a longitudinally extending vehicle frame rail;

a battery assembly mounted completely below said floor pan and completely above said exhaust system and axially between a fuel tank and said vehicle frame rail;

a metallic heat shield panel mounted axially between a tray of said battery assembly and said exhaust system;

an insulation disposed between said tray and a battery pack of said battery assembly;

a first bracket mounted to said tray;

a first bushing mounted within said first bracket;

a second bracket mounted to a cross member that extends transversely from said vehicle frame rail, wherein said second bracket is configured to receive said first bushing; and a first bolt extending through an opening of said second bracket and an inner sleeve of said first bushing to secure said first bushing to said second bracket.

* * * * *